United States Patent [19]

Moore

[11] Patent Number: 5,719,858
[45] Date of Patent: Feb. 17, 1998

[54] TIME-DIVISION MULTIPLE-ACCESS METHOD FOR PACKET TRANSMISSION ON SHARED SYNCHRONOUS SERIAL BUSES

[75] Inventor: Wayne T. Moore, Clearwater, Fla.

[73] Assignee: Paradyne Corporation, Largo, Fla.

[21] Appl. No.: 509,309

[22] Filed: Jul. 31, 1995

[51] Int. Cl.$^6$ .................................. H04B 7/212
[52] U.S. Cl. .................. 370/347; 370/349; 370/442; 370/458; 370/468; 340/825.5
[58] Field of Search .................. 370/349, 331, 370/335, 355, 442, 462, 461, 460, 463, 352, 353, 468, 447, 405, 458, 347; 340/825.5

[56] References Cited

U.S. PATENT DOCUMENTS

| | | | |
|---|---|---|---|
| 4,445,213 | 4/1984 | Baugh et al. | 370/405 |
| 4,611,321 | 9/1986 | Gabrielli et al. | 370/352 |
| 4,750,168 | 6/1988 | Trevitt | 370/462 |
| 4,763,321 | 8/1988 | Calvignac et al. | 370/352 |
| 5,124,983 | 6/1992 | Landez et al. | 370/447 |
| 5,463,624 | 10/1995 | Hogg et al. | 370/461 |

Primary Examiner—Wellington Chin
Assistant Examiner—Melissa Kay Carman
Attorney, Agent, or Firm—Thomas, Kayden, Horstemeyer & Risley

[57] ABSTRACT

A plurality of packet data sources, e.g., packet application modules, and synchronous data sources, e.g., synchronous application modules, are coupled to the same TDM bus for communicating data to a network access module. A portion of the bandwidth, or time-slots, of the TDM bus is allocated as a multiple-access packet channel that is shared among the packet application modules. As a result, the network access module receives a single, continuously multiplexed, packet stream for transmission to an opposite endpoint. Packet application modules on the TDM bus contend for this multiple access packet channel when transmitting to the opposite endpoint. In the receiving direction, each packet application module accepts the entire received packet stream from the network access module and may either filter the packets using their address field or may transparently forward the data to a packet service.

32 Claims, 4 Drawing Sheets

FIG. 8A
INITIALIZE

FIG. 8B
REQUEST TO TRANSMIT A PACKET

FIG. 8C
WAIT FOR PHOLD

TIME-DIVISION MULTIPLE-ACCESS METHOD FOR PACKET TRANSMISSION ON SHARED SYNCHRONOUS SERIAL BUSES

BACKGROUND OF THE INVENTION

The present invention relates to data communications, and more particularly, to communications systems that have channelized network access, and may transport both synchronous data and variable-bit-rate data such as frame relay (hereafter referred to as packet data), in a time-division multiplexed format.

Communications equipment horn as a "network access unit" (NAU) typically provides frame-relay-type services between a local communications network and a network facility, like a T1 facility. The NAU messages the flow of data between the local communications network and the network facility in both directions. To provide the most flexibility, it is preferable that the NAU support two types of data: synchronous data and packet data. For example, the support of synchronous data provides the ability to make telephone, i.e., voice, calls, while the support of packet data provides the ability to interwork with public network packet services. However, the asynchronous nature of packet data at the logical level combined with the requirements of synchronous data causes design tradeoffs in both the complexity and cost of an NAU.

Figure 1:
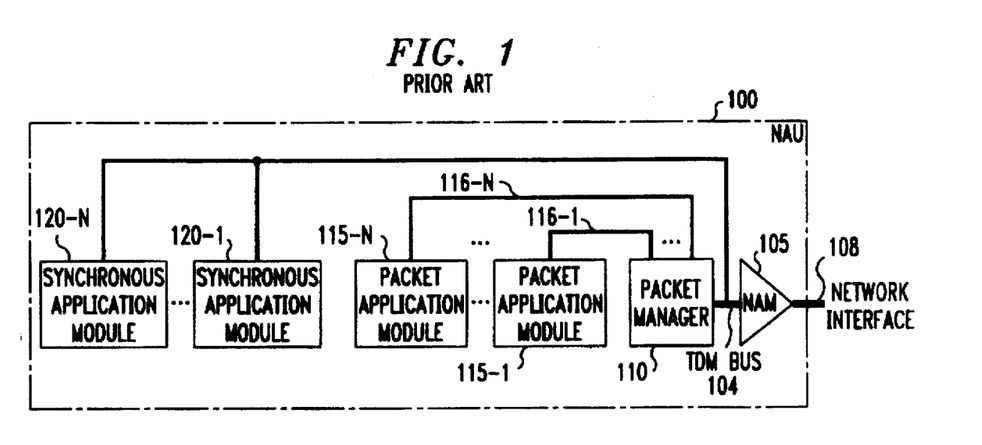
FIG. 1 shows a block diagram of a prior art mixed TDM and packet network access unit.

One prior art approach of designing an NAU to support both synchronous data and packet data is shown in FIG. 1. NAU 100 includes network access module 115-1 105, synchronous application modules 120-1 to 120-n, packet application modules 115-1 to 115-n, and packet manager 110. NAM 105 provides the interface between time-division-multiplexing (TDM) bus 104 and network facility 106, which is representative of a T1 facility. The synchronous application modules couple synchronous data equipment (not shown), e.g., telephone equipment, to NAM 105 via TDM bus 104. The packet application modules couple packet data equipment (not shown), e.g., a data terminal, to packet manager 110. The later is a common resource module that performs internal aggregation in one direction, and distribution in the other direction, of packet streams between NAM 105 and each packet application module, via TDM bus 104 and wideband packet buses 116-1 to 116-n, respectively. In this context, each wideband packet bus is transmitting packet data in parallel, e.g., a "byte" at a time, in contrast to TDM bus 104, which is a serial bus, i.e., it transmits data a bit at a time. As a reset of coupling the packet data to the TDM bus, packet manager 110 provides a single multiplexed packet stream to NAM 105 for transmission across the network interface. It should be understood that the network interface bandwidth is "channelized" and, in the context of packet data, expects a single multiplexed packet stream.

NAU 100 is representative of a mixed TDM and packet NAU architecture. In this approach, NAU 100 provides a TDM bus in conjunction with one or more packet buses which taken together provide more bandwidth than is required to support the network interface. This additional bandwidth is used to support multiple point-to-point packet connections. Packet manager 110 not only aggregates the packet data, as mentioned above, but also allocates a fixed amount of the TDM bandwidth to the packet application modules.

Unfortunately, the instantaneous, or peak, data rate of all outbound packet streams taken together may be greater than the "fixed amount of TDM bandwidth" allocated for packet data on the network interface. These peak data rates create a large demand on both the overall packet bus capacity and on the packet handling requirements of packet manager 110. For example, once the packet application modules exceed their allocated network interface bandwidth, packet manager 110 must take steps to prevent the loss of any packet data. These steps include buffering the packet data, which may require a buffer of considerable size to support all of the packet application modules, and, perhaps, flow control to throttle the packet traffic. As a result, the complexity of packet manager 110 increases not only with the number of packet application modules that packet manager 110 must support but also with the respective data rate requirements of these packet application modules.

Figure 2:
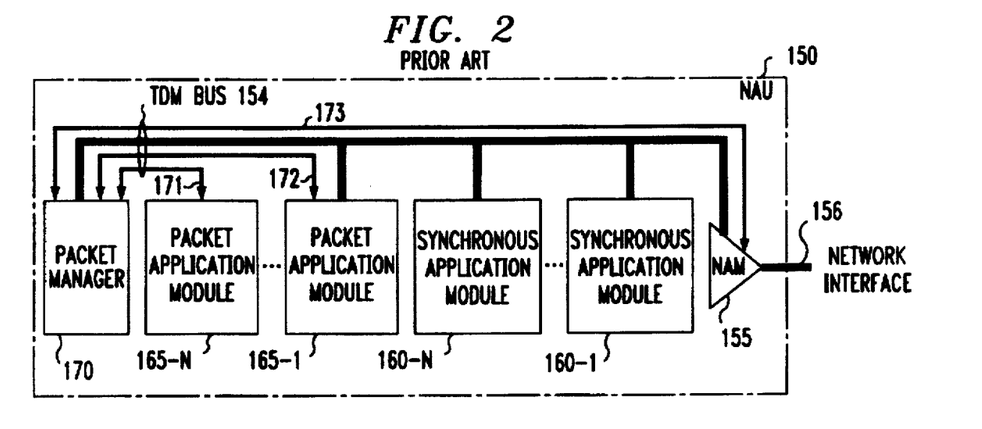
FIG. 2 shows a block diagram of another prior art time-division-multiplexing-only network access unit.

Another prior art approach is illustrated in FIG. 2, which is similar to FIG. 1 except that separate point-to-point wideband packet buses have been replaced with separate TDM channels between each packet application module and the packet manager. In particular, packet application modules 165-1 to 165-n are coupled to TDM bus 154, along with packet manager 170. Each packet application module communicates data to, and from, packet manager 170 in a separate TDM channel as represented by lines 171 and 172. Like the description above for FIG. 1, packet manager 170 aggregates the packet traffic to NAM 155 via a TDM channel, as represented by line 173, to create a single multiplexed packet stream.

Unfortunately, this approach has the above-mentioned problems with respect to the packet manager and, in addition, drives up the bandwidth requirement of the TDM bus. For example, the TDM bus must now support the peak rate of each packet application module on each TDM channel in addition to a TDM channel for the aggregate packet data stream provided by packet manager 170. Conversely, if the TDM channels are limited to a fixed fraction of the allocated network interface bandwidth, a single packet application module would never be able to peak near the full rate when other packet application modules have little or no traffic.

SUMMARY OF THE INVENTION

I have realized an alternative approach to the design of TDM-based equipment that supports both synchronous data and packet data and, in addition, provides an efficient substrate for packet handling. In particular, multiple packet data sources share a single TDM channel. As a result, no central packet manager is required to aggregate the packet data.

In an embodiment of the invention, a plurality of packet data sources, e.g., packet application modules, and synchronous data sources, e.g., synchronous application modules, are coupled to the same TDM bus for communicating data to a network access module. In particular, a portion of the TDM bandwidth allocated to packet data is treated as a "multiple-access packet channel." This allows packet application modules on the TDM bus to share, and contend for, the entire TDM bandwidth allocated to packet data. Each packet application module includes its own TDM bus interface and the network access module receives a single, continuously multiplexed, packet stream for transmission to an opposite endpoint. In the receiving direction, each packet application module accepts the entire received packet stream from the network access module and either filters the packets using their address field or transparently forwards the packet data to a packet service.

In a feature of the invention, a contention scheme for accessing the "multiple-access packet channel" is described that avoids packet collisions, maximizes bandwidth efficiency, and provides for interframe High-level Data Link Control (HDLC) flags.

This invention provides the following advantages: no central packet manager is required to synchronize packet data to the TDM bus; packet sources share all of the TDM bandwidth allocated to packet data resulting in maximum efficiency; there is no additional overhead required for packet addressing on the bus; packet buffering is distributed across the bus, rather than being fixed in a central location; and the system has "modularity" and can quickly grow simply by adding additional packet application modules.

DETAILED DESCRIPTION

Figure 3:
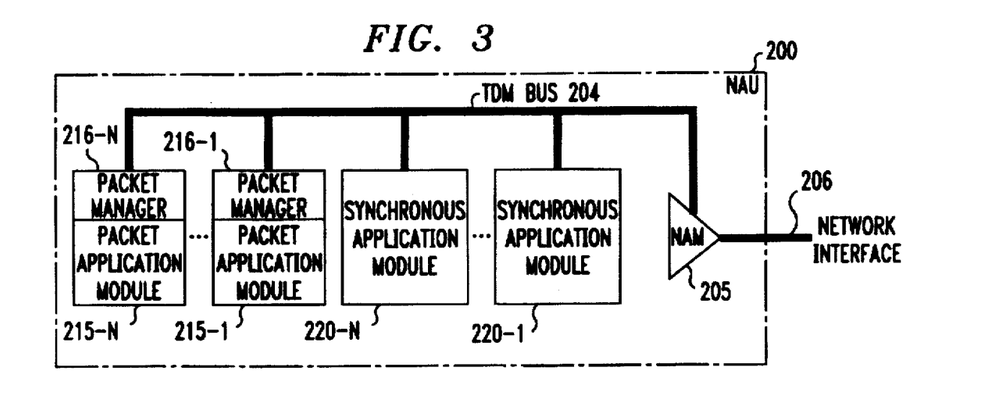
FIG. 3 shows an illustrative block diagram of a time-division-multiplexing-only network access unit in accordance with the principles of the invention.

An illustrative block diagram of an NAU embodying the principles of this invention is shown in FIG. 3. NAU 200 provides access to a T1 facility for frame relay services as well as synchronous data transport. For simplicity, data endpoints, synchronous or packet, are not shown. NAU 200 includes network access module (NAM) 205, synchronous application modules 220-1 to 220-n, and packet application modules 215-1 to 215-n. NAM 205 provides the interface between TDM bus 204 and network facility 206, which is representative of a T1 facility. The synchronous application modules couple synchronous data equipment (not shown), e.g., telephone equipment, to NAM 205 via TDM bus 204, as is known in the art. In accordance with the inventive concept, multiple packet application modules now share a single TDM channel (described below). Each of the plurality of packet application modules couple packet data equipment (not shown), e.g., a data terminal, to TDM bus 204, and the packet manager is eliminated. Indeed, the function of the packet manager is now distributed among the various packet application modules that created the need for it in the first place. This distribution of the packet manager is represented by the inclusion of packet managers 216-1 through 216-n in the respective packet application modules.

Figure 4:
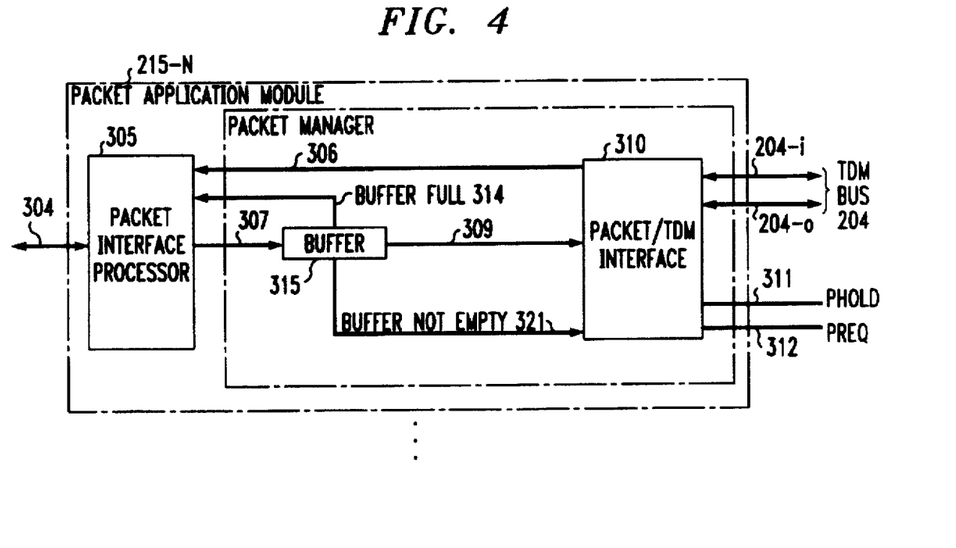
FIG. 4 shows a block diagram of a packet application module in accordance with the principles of the invention.

A block diagram of illustrative packet application module 215-n is shown in FIG. 4. Other than the inventive concept, the components of packet application module 215-n are well-known and will not be described in detail. Packet application module 215-n includes packet interface processor 305, buffer 315, and packet/TDM interface 310. The latter is an "application specific integrated circuit" (ASIC), which is a programmable large-scale integrated circuit device that is dedicated to performing a specific function, or application, which in this case is described below. Packet interface processor 305 communicates packet data between packet/TDM interface 310 and line 304. The latter is representative of any one of a number of facilities for coupling packet application module 215-n to a packet system. For example, line 304 could be a local area network, or a dedicated facility to a "router" or a packet data terminal. Packet interface processor 305 performs packet handling, e.g., it provides the physical and link layer connections for packet transmission as known in the art, e.g., it checks for addresses, errors, etc., on the packets. Packet data transmitted to a far-end packet endpoint is provided from packet interface processor 305 to packet/TDM interface 310 via line 307, buffer 315, and line 309. It is assumed that lines 307 and 309 are representative of wideband data buses as known in the art. In the other direction, packet data from a far-end packet endpoint is received by packet interface processor 305 from packet/TDM interface 310 via line 306. Packet interface processor 305 receives a BUFFER FULL signal via line 314 from buffer 315, which provides a BUFFER NOT EMPTY signal via line 321 to packet/TDM interface 310. In accordance with the principles of the invention, packet/TDM interface 310 synchronizes packet data retrieved from buffer 315 for insertion into an appropriate time slot on TDM bus 204. The latter is shown as actually comprising two TDM buses. TDM bus 204-o is used for "outbound" traffic through NAM 205 to network interface 206. Conversely, TDM bus 204-i is used for "inbound" traffic from the network. Typically, in the art, TDM bus 204-i and 204-o are symmetrical, e.g., if time-slot 0 is used for status and control information on the "inbound" TDM bus, time-slot 0 of the "outbound" TDM is similarly used for status and control information.

The storage size of buffer 315 is determined empirically and is a function of the type of packet equipment and its data rate. For example, if a packet application module is interfacing to a router, as known in the art, a router may communicate packet data on the order of 128 Kb/sec. Consequently if the packet application module cannot, for the moment, transmit a packet from the router to the TDM bus, the packet application module can perform flow control with the router with a concomitant minimal amount of buffering required on the packet application module because of the low data rate from the router. Conversely, if a packet application module is interfacing to a LAN, which typically communicates data at a higher speed, e.g., 10 Mb/sec., a larger amount of buffering may be required on the packet application module. Thus, depending on the packet equipment, each packet application module may have different buffering requirements—but each packet application module has less buffer requirements than the packet manager module of the prior art.

In accordance with the invention, a portion of the bandwidth of TDM bus 204 is pre-assigned to all the packet data. In particular, this packet-dedicated portion of the bandwidth is referred to herein as a "multiple-access packet channel," which is shared among at least two of the packet application modules. This is in contrast to allocating a fixed fraction of the TDM bandwidth to each packet application module. The "multiple-access packet channel" provides a single channel for communicating all packet data to, or from, NAM 205. In effect, this "multiple-access packet channel" resembles a packet "local area network" (LAN) in many respects, except that the bandwidth of the "multiple-access packet channel"

is closely matched (or equal) to that allocated for packet traffic across network facility 206. In this case, each packet application module must contend for the bandwidth of the "multiple-access packet channel" with the other packet application modules. (Although, the nature of a TDM bus prevents any packet application module from using more bandwidth than is available from the network, this approach makes the entire network bandwidth allocated to packet data dynamically available to each packet application module as a channel for the transport of packet data.)

NAM 205 communicates to all application modules and controls time-slot allocation among the synchronous modules and the packet modules. The control of time-slot allocation can be performed either over TDM bus 204 or another bus (not shown). In this example, it is assumed that a portion of the TDM bus bandwidth is allocated to control and status information, as known in the art. In accordance with the principles of the invention, the time-slots allocated by NAM 205 to the packet application modules are the "multiple-access packet channel."

In this example, it is assumed that every time-frame is comprised of a plurality of 64 Kbit (DS0) channels, and it is assumed that the "multiple-access packet channel" is any grouping of these DS0 channels. Although not a requirement, it is also assumed that the "multiple-access packet channel" is composed of a subset of contiguous DS0 channels available on the bus. In this case, this corresponds to time-slots 1, 2, 3, 4, 5, and 6, of every frame. The remaining time-slots are allocated to synchronous data and control/status information. The allocation of the above-mentioned six time-slots yields a "multiple-access packet channel" with a bandwidth of 384 Khz. The number of DS0 channels allocated on the inbound and outbound data highways are assumed to the be same, so that equal bandwidth is assured in both directions. (As described above, it is assumed that TDM bus 204-i and TDM bus 204-o are symmetrical, i.e., time-slots 1 through 6 are used for the "multiple-access packet channel" for inbound and outbound traffic.) Finally, it is assumed that this 384 Khz bandwidth is equal to the bandwidth allocated over the network facility for the same packet traffic, i.e., NAM 205 is not required to buffer the packet data.

Figure 5:
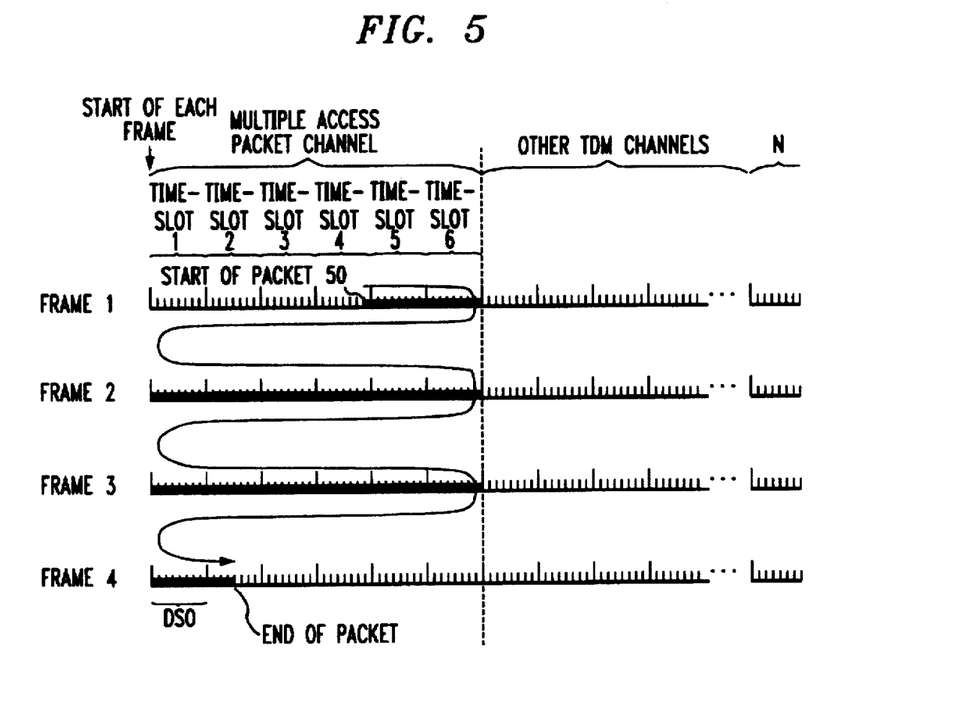
FIG. 5 shows a representation of a sequence of time-division-multiplexing frames in accordance with the principles of the invention.

In accordance with a feature of the invention, it is assumed that packet transmission is utilizing HDLC, which is a bit-oriented layer 2 protocol that produces variable bit length packets. This allows a packet to be spread across time-slots and multiple TDM frames. The "multiple-access packet channel" in this case can be considered a continuous sequence of bits with no framing boundaries other than those of the protocol. As such, the starting point of a packet may lie anywhere in the "multiple-access packet channel." An illustrative sequence of frames is shown in FIG. 5. Frame 1 includes time slots 1 through N, where, as mentioned above, each time-slot represents a 64 Kbit DS0 channel. In this example, it is assumed that N is equal to 64 time-slots. Each frame repeats every 125 micro-seconds and each time-slot is further broken down into a sequence of 8 bits as shown in FIG. 5. Each bit is hereafter referred to as a "bit time-slot." It should be noted that the term "time-slot" refers to a collection of "bit time-slots." Time-slots 1–6 represent the "multiple-access packet channel." As described above, since HDLC is a bit-oriented layer 2 protocol, this allows the packet data to begin and end anywhere in a time-slot. Consequently, each packet is mapped into a plurality of "bit time-slots" within time-slots 1 through 6 on TDM bus 204, rather than the DS0 channels representing each time-slot as a whole. This is illustrated in FIG. 5, where packet 50 begins with "bit time-slot" 7 in time-slot 4, of frame 1, and ends with "bit time-slot 3" in time-slot 2 of frame 4. As illustrated by the starting and ending time of packet 50, of FIG. 5, these bit intervals do not have to conform to time slot boundaries into which the packets are mapped and inserted.

As described above, each packet application module must contend for the "multiple-access packet channel." If a packet application module "grabs" the "multiple-access packet channel" that packet application module then transmits using the full 384 Khz of bandwidth. However, if a packet application module cannot "grab" the "multiple-access packet channel," then that packet application module must queue, or buffer, the packet. As a result, the flow control is now distributed among the packet application modules.

The properties desired for packet transport on the "multiple-access packet channel" are high bandwidth efficiency and deterministic fairness. Bandwidth efficiency is a measure of how closely the packet utilization oft he available (fixed) TDM bandwidth matches the offered packet load. It also measures efficiency of the channel as the offered packet load exceeds the available bandwidth. Fairness describes how a chosen priority scheme affects the comparative delay of packets through the system under bandwidth contention with multiple packet sources.

Any method used for implementing a "multiple-access packet channel" should be designed to achieve as close to 100% bandwidth efficiency as possible with no negative throughput effects due to congestion. The method should also have no inherent priority bias among the packet sources so that priorities may be enforced selectively if needed, preferably in software on the packet application modules. These properties are only applicable to the outbound (toward the network) direction, where multiple packet sources are contending for a fixed network pipe. Inbound packet data is already multiplexed as a single packet stream within the network channel. Since the TDM bus 204 is full duplex, as represented by separate data highways TDM bus 204-i and TDM bus 204-o, NAU 200 may have an asymmetric access protocol. That is, the access protocol for the inbound direction can be different from the access protocol described below for the outbound direction. In the context of this invention, it is assumed that all modules are continually listening to the TDM in-bound bus to pull off data addressed to them. In the case of the packet application modules, it is assumed that each packet application module is monitoring, or listening to, the "multiple-access packet channel" for packets that have addresses associated with that packet application module. A packet application module listens for its header, e.g., virtual address, if it is not their packet, it is just dropped. The remainder of this description will focus on outbound packet traffic.

In accordance with the invention, a Time-division Multiple Access with Collision Avoidance (TDMA/CA) scheme is used for the outbound direction to regulate access to the "multiple-access packet channel." In particular, the synchronous property of TDM bus 204 provides the means to implement a slotted-access method to avoid collisions. This slotted-access method enables each packet application module to contend for the "multiple-access packet channel," and avoid packet collisions, in a fair and efficient manner. In this embodiment, the slotted-access method is implemented by packet/TDM interface 310 of each packet application module.

Before describing it in detail, an overview of this slotted-access method is described. In the slotted-access method, each packet application module, in rotation order, is given an "access window" of time, corresponding to a "bit time-slot" on the TDM bus, to either capture the "multiple-access packet channel" for transmission, or defer and allow the "access window" to advance to the next packet application module in order. Once granted access, that packet application module has sole access to the "multiple-access packet channel" for a period of time, referred to herein as the "access period." During this "access period," a packet application module sends at least one HDLC frame of queued packet traffic toward the network, and the "access window" is frozen at the current packet application module and does not advance until that packet application module releases the "multiple-access packet channel." Under some conditions however, a packet application module may not begin transmitting packet data as soon as it has captured the "multiple-access packet channel." In particular, whenever the previously transmitting packet application module is still transmitting a packet or closing flag, the next packet application module must wait until completion before transmitting its first packet. Since a rotational arbitration scheme on the bus may take several "bit time-slots," or clock, intervals, this mechanism allows the arbitration to overlap an active packet transmission, avoiding idle time on the bus and increasing bandwidth utilization.

Figure 6:
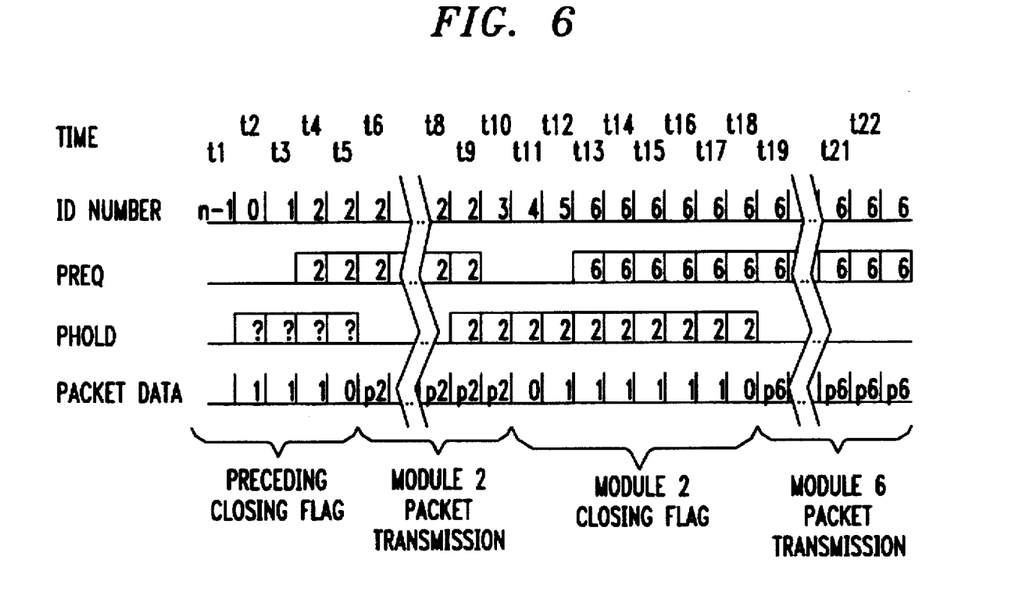
FIG. 6 is an illustration of a packet arbitration scheme for use in the network access unit of FIG. 2 in accordance with the principles of the invention.

FIG. 6 shows an illustrative slotted-access method. There is an implied numbering of the packet application modules and "bit time-slots." This implied numbering is hereafter referred to as an "ID number." Generally speaking, a packet application module can attempt to access TDM bus 204-o only when the ID number of the "bit time-slot" matches the ID number of the packet application module. In a system with N packet application modules, each "bit time-slot" of the "multiple-access packet channel" is counted in a repeating sequence from 0 to N−1 starting at some arbitrary "bit time-slot" by each packet application module. In other words, each packet application module only counts those "bit time-slots" assigned to the "multiple-access packet channel." The value of the count is the ID number for the "bit time-slot." All packet application modules are synchronized with this counting sequence and are aware of the ID number of each "bit time-slot" at all times. As a result, the ID number need not be present on the bus. As noted earlier, each packet application module knows, a priori, the time-slots associated with the "multiple-access packet channel." In combination with this, each packet application module is configured with an unique ID number, which can be determined in any number of ways. For example, each module, or circuit board, can have an address associated either via a "software-controlled" configuration, e.g., a system administer literally assigns addresses to the various modules; or by a hardware setting that specifically associates a particular address with a particular position in the system, e.g., what slot the circuit board is plugged into. Note, this counting of "bit time-slots" may span more than one frame. Since N may be any integer there is no relationship between this ID numbering and the position of bits in the TDM frame.

Figure 7:
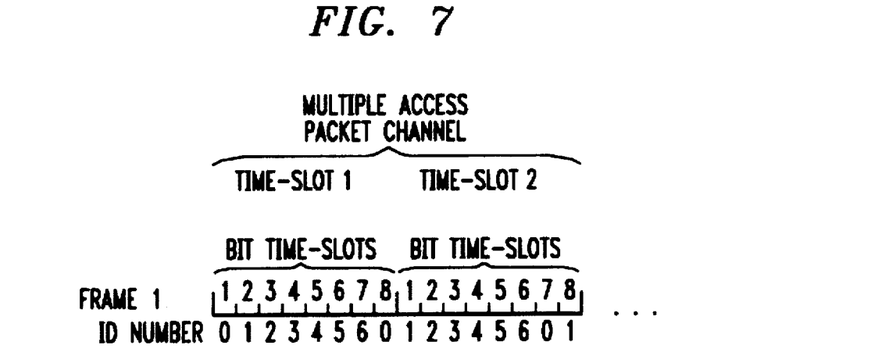
FIG. 7 is an illustration of counting bit time-slots in the "multiple-access packet channel.

For example, if there are seven packet application modules, and assuming for the moment that none of the seven packet application modules wanted access to the TDM bus, this counting would look like that shown in FIG. 7. FIG. 7 is similar to FIG. 5, except packet 50 has been removed, i.e., there is no transmission of a packet and only time-slots 1 and 2 of frame 1 are shown. It is assumed that each packet application module counts "bit time-slots" of the "multiple-access packet channel" beginning with "bit time-slot" 1 of frame 1, which is associated with the count value of 0. Each packet application module waits for its ID number to equal the count, or ID number, of the "bit time-slot" to attempt to access TDM bus 204-o. For example, the packet application module associated with ID 0, can attempt access only upon the value of the count equaling 0, which, in this example, occurs in "bit time-slot" 1 of time-slot 1 of frame 1, "bit time-slot" 8 of time-slot 1 of frame 1, "bit time-slot" 7 of time-slot 2 of frame 1 etc.

To implement this slotted-access method two additional signals are bussed between packet application modules. These signals are "packet request" (PREQ) and "packet hold" (PHOLD). It is assumed these signals are bussed among the packet application modules as simply "open collector" as known in the art which allows them to be logically "OR"ed. Referring back to FIG. 6, a sequence of "bit time-slots" is shown. This sequence of bit time-slots only represents those "bit time-slots" assigned to the "multiple-access packet channel." The top row of FIG. 6 is simply a sequence of bit time reference points. The second row of FIG. 6 is the ID number of the "bit time-slot" of the "multiple-access packet channel," i.e., the value of the count. The next two rows represent the state of the PREQ and PHOLD busses. The final row simply represents packet data.

Beginning at time t2, the "bit time-slot" ID number is equal to 0. In order for a packet application module to transmit a packet on TDM bus 204-o, the packet application module must assert the PREQ signal whenever the ID numbers of the "bit time-slot" and the packet application module match. Upon receiving the PREQ signal, each packet application module halts the counting. The packet application module that asserted the PREQ signal becomes the next in line to begin transmission. For example, when the packet application module associated with the ID number of 2 wants to transmit, it must wait until time t4, when the ID numbers of the "bit time-slot" and the packet application module match, to assert the PREQ signal. However, the presence of a PHOLD signal driven by the currently transmitting packet application module delays the access of packet application module 2 to TDM bus 204-o until PHOLD is withdrawn at time t5. (The question marks illustrated in FIG. 6 simply represent that another, unidentified packet application module is currently transmitting.) At the next "bit time-slot," t6, packet application module 2 concatenates its packet stream with that of the previous transmission.

Although it could occur at any point, it is assumed that packet application module 2 drops the PREQ signal at the end of its packet transmission (described below) to allow the counting of time-slots by all packet application modules to again advance. At the same time, packet application module 2 asserts the PHOLD signal, which prevents the next packet application module from beginning its transmission until packet application module 2 has completed its closing flag sequence. These events occur at time t9. Subsequently, packet application module 6 raises it PREQ signal at time t13, signaling its readiness to send at least one packet, while packet application module 2 is still transmitting its closing flag. At time t18, packet application module 2 completes its packet transmission and drops PHOLD. At time t19, packet application module 6 begins sending its packet data.

It should be noted that the HDLC flags are a byte in length. Consequently, transmission of an HDLC inter-frame flag must end first before another packet application module can get the TDM bus 204-o to insert data. In addition, and in accordance with HDLC, the last packet application module may continue inserting the inter-frame flags, and asserting the PHOLD signal until the PREQ signal is asserted, by itself or another module. Once the PREQ signal is asserted, TDM/packet interface 310 drops the PHOLD signal only when the insertion of the current flag is finished.

As mentioned above, the point at which an actively transmitting packet application module asserts the PHOLD signal and lowers the PREQ signal is arbitrary. The earlier this occurs, the higher the probability that the next packet application module will be found by the time the first closing flag sequence is sent. This increases the efficiency of the "multiple-access packet channel" because there is no waiting for data transmission to finish to start arbitration again, i.e., no time is lost for contention (a packet application module is always ready to go). On the other hand, waiting until near the end of the transmission allows more timely packet queue information to be used in the arbitration. A balance between these two extremes could be implemented.

Figure 8A:
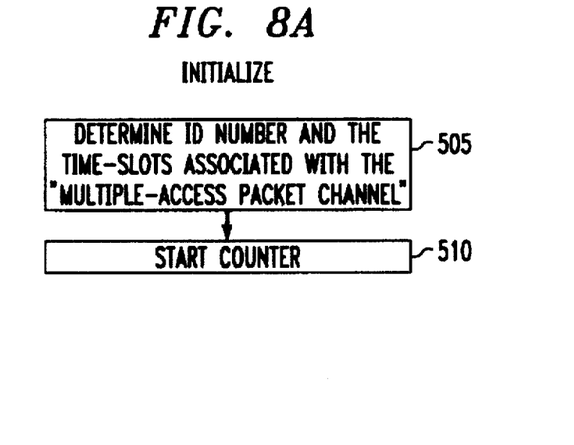
" and FIGS. 8A–8C are illustrative flow diagram of a method in accordance with the principles of the invention for use in the packet application module of FIG. 4.
Figure 8B:
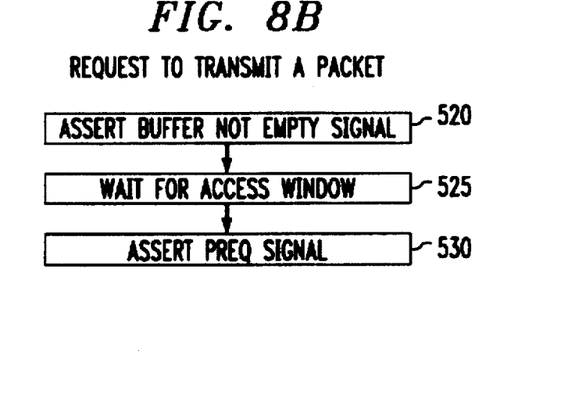
Figure 8C:
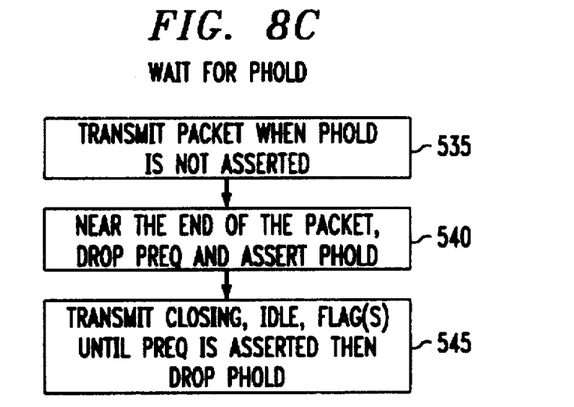

A method illustrating this slotted-access technique for use in the packet application module of FIG. 4 is shown in FIG. 8. The steps shown in FIG. 8 have been divided into different "subroutines" for simplicity, i.e., an "initialize subroutine" (FIG. 8A), "request to transmit a packet subroutine" (FIG. 8B), and a "wait for PHOLD" subroutine (FIG. 8C). In step 505, packet application module 215-n is initialized, e.g., via a power-up sequence, and determines its ID number, e.g., via a hardware strap or software configuration. During this initialization, NAM 205 of FIG. 3 allocates the time-slots associated with the "multiple-access packet channel." Packet/TDM interface 310 uses the assignment information from NAM 205 as the synchronizing signal to begin counting "bit time-slots" of the "multiple access packet channel" in step 510 (provided that the PREQ signal is not asserted). In this example, it is assumed that packet/TDM interface 310 includes a counter to count each "bit time-slot" of TDM bus 204-o that is associated with the "multiple-access packet channel." The counter included within packet/TDM interface 310 rims continuously and is controlled by the PREQ signal, i.e., if PREQ is asserted—no counting takes place and the count holds at the last value.

When there is a packet to transmit, packet interface processor 305 begins to fill buffer 315 provided buffer 315 is not full. In particular, referring briefly back to FIG. 4, it can be seen that a BUFFER FULL signal is provided by buffer 315 to packet interface processor 305. This signal alerts packet interface processor 305 if buffer 315 is full. As a result, packet interface processor 305 fills buffer 315 when packet data is available to transmit only if the BUFFER FULL signal is not active. Once the BUFFER FULL signal is active, packet interface processor 305 could, if necessary, perform flow-control, if possible, with the associated packet endpoint like a router, or simply begin dropping packets. Assuming buffer 315 is initially empty, as packet interface processor 305 begins to fill up buffer 315, the BUFFER NOT EMPTY signal is asserted for TDM/packet interface 310 in step 520, via line 321.

Upon receiving the BUFFER NOT EMPTY signal, TDM/packet interface 310 waits for the "access window" in step 525. Once the "access window" matches, i.e., the ID number of packet application module 215-n matches the current value of the counter, i.e., the "bit time-slot" ID number, TDM/packet interface 310 asserts the PREQ signal in step 530.

In step 535, TDM/packet interface 310 waits until PHOLD is no longer asserted before transmitting the packet from buffer 315 onto TDM bus 204-o. Upon nearing the end of the packet transmission (which can be determined simply by knowing the length of the packet from the packet header information), TDM/packet interface 310 drops the PREQ signal and asserts the PHOLD signal in step 540. As mentioned above, the last packet application module to grab the "multiple-access packet channel" continues inserting flags and asserting PHOLD until PREQ is asserted, by itself or another module. Once PREQ is again asserted, TDM/packet interface 310 drops PHOLD only when the insertion of an flag is finished. At this point the next packet application module then has access to the "multiple-access packet channel."

Within this general method, different approaches may be taken to offset the arbitration fairness. In general, each time a packet application module gains transmission access to the "multiple-access packet channel," it may send any prescribed number of packets. The access method may be designed to limit this number to one, or it may allow the application to empty its packet transmit buffer. If the hardware imposes no limit on the size or number of packets sent during one access period, the application software is then able to implement rules for sending varying amounts of packet traffic across the bus. There is no reason why those rules must be applied the same for every packet application module, and in fact could be different for each port.

For example, the packet application module may send as many packets as can be transmitted within a fixed amount of time. Another possibility is that the amount of packet data transmitted may be a function of the number of packets queued or the time they have been queued. The size of the packets, always known to the software, may also be a factor in determining when to terminate the access period.

The only hardware function required to support such strategies is the combination of the PREQ signal and PHOLD signal. Once the active packet application module is about to fulfill its prescribed transmission requirement, the corresponding packet interface processor either informs the respective TDM/packet interface via a control line (not shown) or the TDM/packet interface continues transmitting until a corresponding BUFFER EMPTY signal (not shown) is received by the TDM/packet interface. Whatever the signal, the TDM/packet interface then stops asserting PREQ to allow another packet application module to gain access to the TDM bus.

As noted above, the above description assumed that the packet/TDM interface was incorporated in a single ASIC bus interface chip. This is feasible if bus speeds and capacities are modest, say 10–20 Mbps maximum throughput, and only one packet channel is required. As a result, the use of an ASIC to implement a bus interface chip to integrate these functions should result in minimal additional cost (in quantity). Further, adding support for a second packet channel may be a similar incremental cost. However, boosting the TDM bus capacity to T3 rates or higher will pose the greatest potential cost increase due to higher bus clock rates and the number of 64K channels. At this level, an ASIC having a much larger gate-count may be needed to provide a large number of timeslot registers, increased buffering, and higher speed DMA channels.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with functional building blocks, e.g., a packet interface processor, etc., the functions of any one or more of those building blocks can be carried out using one or more appropriate integrated circuits.

In addition, although illustrated in the context of a T1 network facility, the inventive concept applies to other network facilities as well, e.g., fractional T1, digital data service (DDS), T3, etc. Further, more than one "multiple-access packet channel," can exist. For example, a first plurality of packet application modules may be assigned to a first group of time-slots, e.g., time-slots 1–6, for transmitting packet data, while a second plurality of packet application modules is assigned to a second group of time-slots, e.g., time-slots 7–12, for transmitting packet data. Also, because the bandwidth of a TDM bus may be divided into many separate logical channels, data with different formats and access methods, such as isochronous and packet data, may be combined in the system. Mother variation is to use the time-slots to control contention access, as opposed to the "bit-time slots," described above.

It should also be noted that the inventive concept is applicable to Asynchronous Transfer Mode (ATM) transmission. In particular, ATM cells are handled in a similar manner, although not on the same "multiple-access packet channel" carrying bit-oriented protocols. In the case of ATM cells, the octets which form the cells need to be aligned within DS0 channels. This places an additional constraint on the packet/TDM interface to recognize those boundaries and transmit within them. The "bit time-slots" may still be used in the same manner as describe above for arbitration however. Another property of ATM cells is that they are not delimited by flags. Idle time between cells transporting user data must be filled with null cells. Responsibility for filling voids in the cell stream may be assigned to the packet application modules to perform in a fashion similar to adding flag fills for HDLC protocols described earlier. Alternatively, this could be the responsibility of the NAM on the outbound trunk, especially if the NAM is required to buffer cells in order to map them onto the network link.

What is claimed:

1. Data communications apparatus comprising:
   a time division multiplexed bus having a bandwidth, where a portion of the bandwidth is allotted to packet data;
   a plurality of packet data sources coupled to the time-division multiplexed bus that share the allotted bandwidth for transmitting packet data; and
   a distributed packet manager within each of said packet data sources configured to allocate access to the allotted bandwidth among said packet data sources.

2. The apparatus of claim 1 including a packet arbitration bus comprising a packet request signal and a packet hold signal.

3. The apparatus of claim 2 wherein each packet data source comprises:
   interface circuitry that inserts packets to the allocated bandwidth of the time-division multiplexed bus and is coupled to the packet arbitration bus; and
   a packet data processor for providing the packets from a packet endpoint to the interface circuitry.

4. Data communications apparatus comprising:
   a time-division multiplexed bus having a bandwidth, where a portion of the bandwidth is allocated to packet data;
   a plurality of packet data sources coupled to the time-division multiplexed bus that share the allocated bandwidth for transmitting packet data;
   a packet arbitration bus comprising a packet request signal and a packet hold signal;
   interface circuitry coupled to the packet arbitration bus, said interface circuitry inserting packets to the allocated bandwidth of the time-division multiplexed bus, and performing a counting function by counting time-slots of the allocated bandwidth so long as the packet request signal is not asserted; and
   a packet data processor for providing the packets from a packet endpoint to the interface circuitry.

5. The apparatus of claim 4 wherein the time-slots are bit time-slots.

6. The apparatus of claim 4 wherein the interface circuitry inserts the packets into the allocated bandwidth when a value of the counter is equal to a predetermined identification number of the respective packet data source and the packet hold signal is not asserted.

7. Communications apparatus comprising:
   a time-division multiplexed bus having a predefined bandwidth;
   a plurality of synchronous data sources coupled to the time-division multiplexed bus for communicating synchronous data in a first portion of the predefined bandwidth;
   a plurality of packet data sources coupled to the time-division multiplexed bus for communicating packet data in a second portion of the predefined bandwidth, where the plurality of packet data sources share the second portion of the predefined bandwidth for transmitting packet data; and
   a distributed packet manager within each of said packet data sources configured to allocate access to the second portion of the predefined bandwidth among said packet data sources.

8. The apparatus of claim 7 further including a network access manager coupled to the time-division-multiplexed bus for communicating the synchronous data and the packet data to at least one network facility.

9. Communications apparatus comprising:
   a time-division multiplexed bus having a predefined bandwidth;
   a plurality of synchronous data sources coupled to the time-division multiplexed bus for communicating synchronous data in a first portion of the predefined bandwidth; and
   a plurality of packet data sources coupled to the time-division multiplexed bus for communicating packet data in a second portion of the predefined bandwidth, where the plurality of packet data sources share the second portion of the predefined bandwidth for transmitting packet data, the second portion of the predefined bandwidth being shared in such a way that only one of the plurality of packet data sources accesses the second portion of the predefined bandwidth at a time.

10. The apparatus of claim 7 wherein each one of the plurality of packet data sources includes interface circuitry to the time-division multiplexed bus for synchronizing packet data to the time-division multiplexed bus.

11. Communications apparatus comprising:
    a time-division multiplexed bus having a predefined bandwidth;
    a plurality of synchronous data sources coupled to the time-division multiplexed bus for communicating synchronous data in a first portion of the predefined bandwidth;
    a plurality of packet data sources coupled to the time-division multiplexed bus for communicating packet data in a second portion of the predefined bandwidth, where the plurality of packet data sources share the second portion of the predefined bandwidth for transmitting packet data, wherein each one of the plurality of packet data sources includes interface circuitry to the time-division multiplexed bus for synchronizing packet data to the time-division multiplexed bus, and the interface circuitry includes a counter for counting time-slots representing the second portion of the predefined bandwidth.

12. The apparatus of claim 11 wherein the time-slots are bit time-slots.

13. The apparatus of claim 11 wherein the interface circuitry inserts packets into the second portion of the predefined bandwidth when a value of the counter equals a predetermined identification number of a respective packet data source and a hold signal is not being asserted by the interface circuitry of the remaining packet data sources.

14. The apparatus of claim 11 wherein the counter is inhibited from counting when a packet request signal is asserted by interface circuitry from any packet data source.

15. A method for use in a data communications apparatus for transmitting packet data on a time-division multiplexed bus, the method comprising the steps of:
coupling a plurality of packet data sources to the time-division multiplexed bus;
allocating a portion of the bandwidth of the time-division multiplexed bus to the plurality of packet data sources in such a way that the allocated portion is shared among the plurality of packet data sources;
transmitting packet data from the plurality of packet data sources on the allocated portion of the bandwidth; and
controlling access by said packet data sources to the allocated portion of the bandwidth via a distributed packet manager within each of said packet data sources.

16. A method for use in a data communications apparatus for transmitting packet data on a time-division multiplexed bus, the method comprising the steps of:
coupling a plurality of packet data sources to the time-division multiplexed bus;
allocating a portion of the bandwidth of the time-division multiplexed bus to the plurality of packet data sources in such a way that the allocated portion is shared among the plurality of packet data sources;
assigning to each one of the plurality of packet data sources an identification number;
counting, in each one of the plurality of packet data sources, a sequence of time-slots representing the allocated portion of the bandwidth; and
transmitting packet data from one of the plurality of packet data sources on the allocated portion of the bandwidth only when the value of the count matches the respective identification number assigned to that packet data source.

17. The method of claim 16, wherein said step of counting a sequence of time-slots representing the allocated portion of the bandwidth is enabled only when none of the plurality of packet data sources assert a packet request signal.

18. The method of claim 16, wherein said step of transmitting packet data from one of the plurality of packet data sources is enabled only if a packet hold signal is not asserted by any other one of the plurality of packet data sources.

19. The method of claim 16, wherein said step of counting a sequence of time-slots representing the allocated portion of the bandwidth further comprises counting bit time-slots.

20. A method for transmitting packet data on a time-division multiplexed bus in data communications equipment, the method comprising the steps of:
allocating a portion of the bandwidth of the time-division multiplexed bus as a multiple-access packet channel;
coupling a plurality of packet data sources to the time-division multiplexed bus;
controlling the access by said packet data sources to the allocated portion of the bandwidth via a distributed packet manager within each of said packet data sources;
transmitting packet data from the one of the plurality of packet data sources having access to the multiple-access packet channel.

21. A method for transmitting packet data on a time-division multiplexed bus in data communications equipment, the method comprising the steps of:
allocating a portion of the bandwidth of the time-division multiplexed bus as a multiple-access packet channel;
coupling a plurality of packet data sources to the time-division multiplexed bus;
assigning a unique identification number to each one of the plurality of packet data sources;
counting, in each one of the plurality of packet data sources, a sequence of time-slots representing the multiple-access packet channel;
granting access to the multiple-access packet channel to that one of the plurality of packet data sources that requests access when the value of the count matches the respective identification number of that packet data source; and
transmitting packet data from the one of the plurality of packet data sources having access to the multiple-access packet channel.

22. The method of claim 21 wherein the counting step is enabled only when none of the plurality of packet data sources assert a packet request signal.

23. The method of claim 21 wherein the granting step further includes the step of asserting a packet request signal by the packet data source granted access.

24. The method of claim 21 wherein the counting step counts a sequence of bit time-slots.

25. A method for transmitting packet data on a time-division multiplexed bus for use in data communications equipment, the method comprising the steps of:
allocating a portion of the bandwidth of the time-division multiplexed bus as a multiple-access packet channel;
coupling a plurality of packet data sources to the time-division multiplexed bus;
arbitrating between the plurality of packet data sources to grant access to the multiple-access packet channel to one of the plurality of packet data sources at a time; and
transmitting packet data from the one of the plurality of packet data sources having access in the arbitrating step only if a packet hold signal is not asserted by another one of the plurality of packet data sources.

26. The method of claim 20 further comprising the step of coupling a network access module to the time-division multiplexed bus for receiving the packet data for transmission over a network facility.

27. A data communications apparatus, comprising;
a time-division multiplexed bus with a bandwidth which is split into at least two portions, one of the portions being allocated for packet data;
a plurality of packet data sources coupled to said time-division multiplexed bus, the packet data sources transmitting packet data on said portion allocated for packet data; and means for arbitrating access to the portion of the time-division multiplexed bus allocated for packet data among the plurality of packet data sources.

28. The apparatus of claim 27, wherein said means for arbitrating access to the portion of the time-division multiplexed bus allocated for packet data further comprises a packet arbitration bus having a packet request signal and a packet hold signal, the arbitration bus being coupled to each of the packet data sources, and the packet data sources including means for generating the packet request signal and the packet hold signal.

29. The apparatus of claim 28, wherein said means for arbitrating access to the portion of the time-division multiplexed bus allocated for packet data further comprises a means within each packet data source for counting the time-slots of the portion of the time-division multiplexed bus.

30. The apparatus of claim 29, wherein said means for arbitrating access to the portion of the time-division multiplexed bus allocated for packet data further comprises the communication of packet data by one of the packet data sources when the packet hold signal is not asserted and the value of said counting means is equal to a predetermined identification number assigned to said packet data source.

31. The apparatus of claim 29, wherein said means for arbitrating access to the portion of the time-division multiplexed bus allocated for packet data further comprises means for generating the packet request signal by a packet data source wishing to gain access to the time-division multiplexed bus when the value of said counting means is equal to a predetermined identification number assigned to said packet data source, said counting means being stopped by said packet request signal.

32. The apparatus of claim 29, wherein said means for arbitrating access to the portion of the time-division multiplexed bus allocated for packet data further comprises means for releasing said packet request signal and for asserting said packet hold signal by a packet data source while said packet data source is transmitting packet data.

* * * * *